(12) United States Patent
Huang et al.

(10) Patent No.: US 9,990,460 B2
(45) Date of Patent: Jun. 5, 2018

(54) SOURCE BEAM OPTIMIZATION METHOD FOR IMPROVING LITHOGRAPHY PRINTABILITY

(71) Applicant: Taiwan Semiconductor Manufacturing Co., Ltd., Hsin-Chu (TW)

(72) Inventors: Hsu-Ting Huang, Hsinchu (TW); Shuo-Yen Chou, Hualien County (CN); Ru-Gun Liu, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days. days.

(21) Appl. No.: 15/282,131

(22) Filed: Sep. 30, 2016

(65) Prior Publication Data

US 2018/0096094 A1  Apr. 5, 2018

(51) Int. Cl.
*G06F 17/50* (2006.01)
*G03F 1/78* (2012.01)

(52) U.S. Cl.
CPC ............ *G06F 17/5081* (2013.01); *G03F 1/78* (2013.01); *G06F 2217/08* (2013.01)

(58) Field of Classification Search
CPC ............................ G06F 17/50; G06F 2217/12
USPC .................................................... 716/50, 54
See application file for complete search history.

(56) References Cited

U.S. PATENT DOCUMENTS

| | | | |
|---|---|---|---|
| 8,146,026 B2 | 3/2012 | Agarwal et al. | |
| 8,176,445 B1 * | 5/2012 | Qian | G06F 17/5068 716/122 |
| 8,245,159 B2 | 8/2012 | Liu et al. | |
| 8,365,106 B2 | 1/2013 | Kawashima | |
| 8,527,916 B1 | 9/2013 | Chiang et al. | |
| 8,542,340 B2 * | 9/2013 | Ye et al. | G03F 7/70091 355/52 |
| 8,572,520 B2 | 10/2013 | Chou et al. | |
| 8,589,828 B2 | 11/2013 | Lee et al. | |
| 8,589,830 B2 | 11/2013 | Chang et al. | |
| 8,627,241 B2 | 1/2014 | Wang et al. | |
| 8,631,360 B2 | 1/2014 | Wang et al. | |
| 8,631,361 B2 | 1/2014 | Feng | |
| 8,732,626 B2 | 5/2014 | Liu et al. | |
| 8,739,080 B1 | 5/2014 | Tsai et al. | |
| 8,745,550 B2 | 6/2014 | Cheng et al. | |

(Continued)

*Primary Examiner* — Sun Lin
(74) *Attorney, Agent, or Firm* — Haynes and Boone, LLP

(57) ABSTRACT

Source beam optimization (SBO) methods are disclosed herein for enhancing lithography printability. An exemplary method includes receiving an integrated circuit (IC) design layout and performing an SBO process using the IC design layout to generate a mask shot map and an illumination source map. The SBO process uses an SBO model that collectively simulates a mask making process using the mask shot mask and a wafer making process using the illumination source map. A mask can be fabricated using the mask shot map, and a wafer can be fabricated using the illumination source map (and, in some implementations, using the mask fabricated using the mask shot map). The wafer includes a final wafer pattern that corresponds with a target wafer pattern defined by the IC design layout. The SBO methods disclosed herein can significantly reduce (or eliminate) variances between the final wafer pattern and the target wafer pattern.

20 Claims, 8 Drawing Sheets

(56) References Cited

U.S. PATENT DOCUMENTS

| | | |
|---|---|---|
| 8,751,976 B2 | 6/2014 | Tsai et al. |
| 8,762,900 B2 | 6/2014 | Shin et al. |
| 8,812,999 B2 | 8/2014 | Liu et al. |
| 8,850,366 B2 | 9/2014 | Liu et al. |
| 8,916,315 B2 | 12/2014 | Fujimura et al. |
| 8,966,409 B2 | 2/2015 | He et al. |
| 2007/0253637 A1 | 11/2007 | Adam |
| 2013/0267047 A1 | 10/2013 | Shih et al. |
| 2014/0040838 A1 | 2/2014 | Liu et al. |
| 2014/0101624 A1 | 4/2014 | Wu et al. |
| 2014/0109026 A1 | 4/2014 | Wang et al. |
| 2014/0120459 A1 | 5/2014 | Liu et al. |
| 2014/0268075 A1 | 9/2014 | Iuoue et al. |
| 2014/0282334 A1 | 9/2014 | Hu et al. |
| 2015/0040079 A1 | 2/2015 | Chen et al. |
| 2015/0286146 A1 | 10/2015 | Chang et al. |

\* cited by examiner

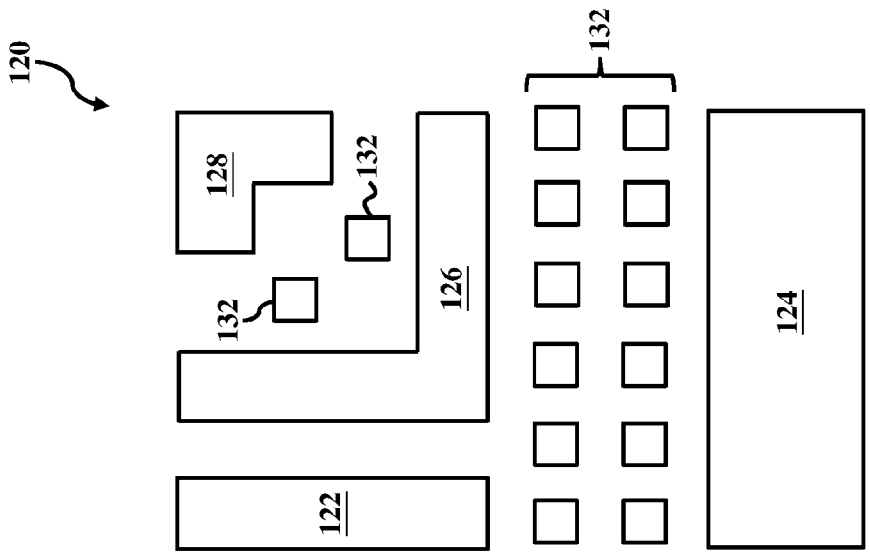

SOURCE BEAM OPTIMIZATION METHOD FOR IMPROVING LITHOGRAPHY PRINTABILITY

BACKGROUND

Integrated circuit (IC) design becomes more challenging as IC technologies continually progress towards smaller feature sizes, such as 32 nanometers, 28 nanometers, 20 nanometers, and below. For example, when fabricating IC devices, IC device performance is seriously influenced by lithography printability capability, which indicates how well a final wafer pattern formed on a wafer corresponds with a target wafer pattern defined by an IC design layout. Various methods (such as optical proximity correction (OPC), mask proximity correction (MPC), and inverse lithography technology (ILT)) have been introduced for enhancing lithography printability, which focus on optimizing a mask used for projecting an image that corresponds with the target wafer pattern on the wafer. However, lithography printing capability is also limited by the wafer fabrication process itself, which uses the optimized mask. Although existing methods for enhancing lithography printability have been generally adequate for their intended purposes, they have not been entirely satisfactory in all respects

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion

FIG. 3 and FIG. 4 are schematic diagrammatic views of an IC design layout at different IC design stages, which can be implemented in the method of FIG. 2, according to various aspects of the present disclosure.

DETAILED DESCRIPTION

Figure 1:
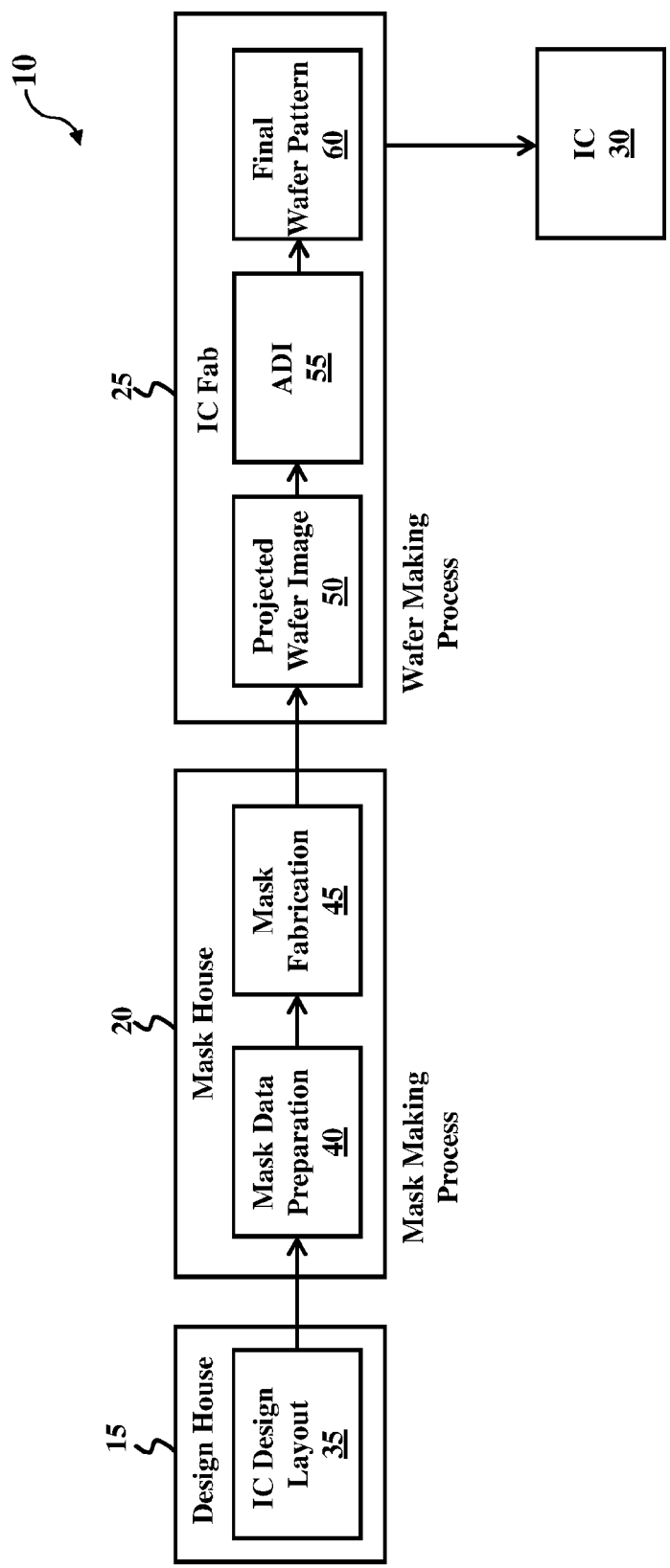
FIG. 1 is a simplified block diagram of an integrated circuit (IC) manufacturing system, along with an IC manufacturing flow associated with the IC manufacturing system, according to various aspects of the present disclosure.

The present disclosure relates generally to lithography process optimization, and more particularly, to methods for enhancing lithography printability.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a simplified block diagram of an integrated circuit (IC) manufacturing system 10, along with an IC manufacturing flow associated with IC manufacturing system 10, according to various aspects of the present disclosure. IC manufacturing system 10 includes a plurality of entities, such as a design house (or design team) 15, a mask house 20, and an IC manufacturer 25 (for example, an IC fab), that interact with one another in design, development, and manufacturing cycles and/or services related to manufacturing an IC device 30. The plurality of entities are connected by a communication network, which may be a single network or a variety of different networks, such as an intranet and/or Internet, and may include wired and/or wireless communication channels. Each entity may interact with other entities and may provide services to and/or receive services from the other entities. One or more of design house 15, mask house 20, and IC manufacturer 25 may be owned by a single large company, and may even coexist in a common facility and use common resources.

Design house 15 generates an IC design layout 35 (also referred to as an IC design pattern). IC design layout 35 includes various circuit patterns (represented by geometrical shapes) designed for an IC product based on specifications of an IC product to be manufactured. The circuit patterns correspond to geometrical patterns formed in various material layers (such as metal layers, dielectric layers, and/or semiconductor layers) that combine to form IC features (components) of the IC product, such as IC device 30. For example, a portion of IC design layout 35 includes various IC features to be formed in a substrate (for example, a silicon wafer) and/or in various material layers disposed on the substrate. The various IC features can include an active region, a gate feature (for example, a gate dielectric or a gate electrode), a source region/feature and a drain region/feature, an interconnection feature (for example, conductive lines and/or conductive vias), bonding pad features, other IC feature, or combinations thereof. IC design layout 35 may include assist features for providing imaging effects, process enhancements, and/or identification information. In some implementations, assist features are inserted into IC design layout 35 using a geometry proximity correction (GPC) process, similar to an optical proximity correction (OPC) process used for optimizing mask patterns (mask layouts). GPC may consider environmental impacts associated with IC fabrication, including lithography loading effects (such as etching loading effects and patterning loading effects associated with exposing and developing processes) and chemical mechanical polishing process effects arising from pattern density variations. Design house 15 implements a proper design procedure to form IC design layout 35. The design procedure may include logic design, physical design, place and route, or combinations thereof. IC design layout 35 is presented in one or more data files having information of the circuit patterns (geometrical patterns). For example, IC design layout 35 is expressed in a Graphic Database System file format (such as GDS or GDSII). In another example, IC design layout 35 is expressed in another suitable file format, such as Open Artwork System Interchange Standard file format (such as OASIS or OAS).

Mask house 20 uses IC design layout 35 to manufacture one or more masks, which are used for fabricating various layers of IC device 30 according to IC design layout 35. A mask (also referred to as a photomask or reticle) refers to a patterned substrate used in a lithography process to pattern a wafer, such as a semiconductor wafer. Mask house 20 performs mask data preparation 40, where IC design layout 35 is translated into a form that can be written by a mask writer to generate a mask. For example, IC design layout 35 is translated into machine readable instructions for a mask writer, such as an electron-beam (e-beam) writer. Mask data preparation 40 generates a mask pattern (mask layout) and corresponding mask shot map, which defines an exposure pattern for printing the mask pattern. The mask pattern is generated by fracturing IC design layout 35 into a plurality of mask features (mask regions) suitable for a mask making lithography process, such as an e-beam lithography process. The fracturing process is implemented according to various factors, such as IC feature geometry, pattern density differences, and/or critical dimension (CD) differences, and the mask features are defined based on methods implemented by the mask writer for printing mask patterns. In some implementations, where an e-beam writer uses a variable-shaped beam (VSB) method for printing mask patterns, a mask pattern is generated by fracturing IC design layout 35 into polygons (such as rectangles or trapezoids), where a corresponding mask shot map includes exposure shot information for each polygon. For example, at least one corresponding exposure shot, including an exposure dose, an exposure time, and/or an exposure shape, is defined for each polygon. In some implementations, where an e-beam writer uses a character projection (CP) method for printing mask patterns, a mask pattern is generated by fracturing IC design layout 35 into characters (typically representing complex patterns) that correspond with a stencil used by the e-beam writer, where a corresponding mask shot map includes exposure shot information for each character. For example, at least one corresponding exposure shot, including an exposure dose, an exposure time, and/or an exposure shape, is defined for each character. In such implementations, any portions of fractured IC design layout 35 that do not match characters in the stencil can be printed using the VSB method.

Mask data preparation 40 can include various processes for optimizing the mask pattern, such that a final pattern formed on a wafer (often referred to as a final wafer pattern) by a lithography process using a mask fabricated from the mask pattern exhibits enhanced resolution and precision. For example, mask data preparation 40 can implement optical proximity correction (OPC), which uses lithography enhancement techniques to compensate for image distortions and errors, such as those that arise from diffraction, interference, or other process effects. OPC can add assist features, such as scattering bars, serifs, and/or hammerheads, to the mask pattern according to optical models or optical rules such that, after a lithography process, a final pattern on a wafer exhibits enhanced resolution and precision. In some implementations, the assist features can compensate for line width differences that arise from different densities of surrounding geometries. In some implementations, the assist features can prevent line end shortening and/or line end rounding. OPC can further correct for electron beam (e-beam) proximity effects and/or perform other optimization features. In some implementations, mask data preparation 40 can implement a mask rule check (MRC) process that checks the mask pattern after undergoing an OPC process, where the MRC process uses a set of mask creation rules. The mask creation rules can define geometric restrictions and/or connectivity restrictions to compensate for variations in IC manufacturing processes. In some implementations, mask data preparation 40 can implement a lithography process check (LPC) process, which simulates wafer making processes that will be implemented by IC manufacturer 25 to fabricate IC device 30. In some implementations, the LPC process simulates an image of a mask based on a generated mask pattern using various LPC models (or rules), which may be derived from actual processing parameters implemented by IC fab 25. The processing parameters can include parameters associated with various processes of the IC manufacturing cycle, parameters associated with tools used for manufacturing the IC, and/or other aspects of the manufacturing process. The LPC process takes into account various factors, such as image contrast, depth of focus ("DOF"), mask error sensitivity ("MEEF"), other suitable factors, or combinations thereof. After a simulated manufactured device has been created by LPC, if the simulated device is not close enough in shape to satisfy design rules, certain steps in mask data preparation 40, such as OPC and MRC, may be repeated to further refine the IC design layout. It should be understood that mask data preparation 40 has been simplified for the purposes of clarity, and mask data preparation 40 can include additional features, processes, and/or operations for modifying the IC design layout to compensate for limitations in lithographic processes used by IC fab 25.

Mask house 20 also performs mask fabrication 45, where a mask is fabricated according to the mask pattern and corresponding mask shot map generated by mask data preparation 40. In some implementations, the mask pattern and corresponding mask shot map are modified during mask fabrication 45 to comply with a particular mask writer and/or mask manufacturer. During mask fabrication 45, a mask making process is implemented that fabricates a mask based on the mask pattern (mask layout) and corresponding mask shot map. The mask includes a mask substrate and a patterned mask layer, where the patterned mask layer includes a final (real) mask pattern. The final mask pattern, such as a mask contour, corresponds with the mask pattern (which corresponds with a target wafer pattern provided by IC design layout 35). In some implementations, the mask is a binary mask. In such implementations, according to one example, an opaque material layer (such as chromium) is formed over a transparent mask substrate (such as a fused quartz substrate or calcium fluoride ($CaF_2$)), and the opaque material layer is patterned using the mask shot map to form a mask having opaque regions and transparent regions. In some implementations, the mask is a phase shift mask (PSM) that can enhance imaging resolution and quality, such as an attenuated PSM or alternating PSM. In such implementations, according to one example, a phase shifting material layer (such as molybdenum silicide (MoSi) or silicon oxide ($SiO_2$)) is formed over a transparent mask substrate (such as a fused quartz substrate or calcium fluoride ($CaF_2$)), and the phase shifting material layer is patterned using the mask shot map to form a mask having partially transmitting, phase shifting regions and transmitting regions. In another example, the phase shifting material layer is a portion of the transparent mask substrate, such that the mask pattern is formed in the transparent mask substrate using the mask shot map. In some implementations, the mask is an extreme ultraviolet (EUV) mask. In such implementations, according to one example, a reflective layer is formed over a substrate, an absorption layer is formed over the reflective layer, and the absorption layer (such as a tantalum boron nitride (TaBN)) is patterned using the mask shot map to form a mask having reflective regions. The substrate includes a low thermal expansion material (LTEM), such as fused quartz, $TiO_2$ doped $SiO_2$, or other suitable low thermal expansion materials. The reflective layer can include multiple layers formed on the substrate, where the multiple layers include a plurality of film pairs, such as molybdenum-silicide (Mo/Si) film pairs, molybdenum-beryllium (Mo/Be) film pairs, or other suitable material film pairs configured for reflecting EUV radiation (light). The EUV mask may further include a capping layer (such as ruthenium (Ru)) disposed between the reflective layer and the absorption layer. Alternatively, another reflective layer is formed over the reflective layer and patterned using the optimized mask shot map to form an EUV phase shift mask.

Mask fabrication 45 can implement various lithography processes for fabricating the mask. For example, the mask making process includes a lithography process, which involves forming a patterned energy-sensitive resist layer on a mask material layer using the mask shot map and transferring a pattern defined in the patterned resist layer to the mask patterning layer. The mask material layer is an absorption layer, a phase shifting material layer, an opaque material layer, a portion of a mask substrate, and/or other suitable mask material layer. Forming the patterned energy-sensitive resist layer can include forming an energy-sensitive resist layer on the mask material layer (for example, by spin coating), performing a charged particle beam exposure process, and performing a developing process. Based on the mask shot map, the charged particle beam exposure process directly "writes" a pattern into the energy-sensitive resist layer using a charged particle beam, such as an electron beam or an ion beam. Since the energy-sensitive resist layer is sensitive to charged particle beams, exposed portions of the energy-sensitive resist layer chemically change, and exposed (or non-exposed) portions of the energy-sensitive resist layer are dissolved during the developing process depending on characteristics of the energy-sensitive resist layer and characteristics of a developing solution used in the developing process. After development, the patterned resist layer includes a resist pattern that corresponds with the mask pattern. The resist pattern is then transferred to the mask material layer by any suitable process, such that a final mask pattern is formed in the mask material layer. For example, the mask making process can include performing an etching process that removes portions of the mask material layer, where the etching process uses the patterned energy-sensitive resist layer as an etch mask during the etching process. After the etching process, the lithography process can include removing the patterned energy-sensitive resist layer from the mask material layer, for example, by a resist stripping process. During the etching process, etching rate and etching behavior may depend on a global etching pattern density, often referred to as global etching loading effect.

IC manufacturer 25, such as a semiconductor foundry, uses the mask (or masks) fabricated by mask house 20 to fabricate IC device 30. For example, a wafer making process is implemented that uses a mask to fabricate a portion of IC device 30 on a wafer, such as a semiconductor wafer. In some implementations, IC manufacturer 25 performs wafer making process numerous times using various masks to complete fabrication of IC device 30. Depending on the IC fabrication stage, the wafer can include various material layers (for example, dielectric material layers, semiconductor material layers, and/or conductive material layers) and/or IC features (for example, doped regions/features, gate features, and/or interconnect features) when undergoing the wafer making process. The wafer making process includes a lithography process, which involves forming a patterned resist (photoresist) layer on a wafer material layer using a mask, such as the mask fabricated by mask house 20, and transferring a pattern defined in the patterned resist layer to the wafer material layer. The wafer material layer is a dielectric material layer, a semiconductor material layer, a conductive material layer, a portion of a substrate, and/or other suitable wafer material layer.

Forming the patterned resist layer can include forming a resist layer on the wafer material layer (for example, by spin coating), performing a pre-exposure baking process, performing an exposure process using the mask (including mask alignment), performing a post-exposure baking process, and performing a developing process. During the exposure process, the resist layer is exposed to radiation energy (such as ultraviolet (UV) light, deep UV (DUV) light, or extreme UV (EUV) light) using an illumination source, where the mask blocks, transmits, and/or reflects radiation to the resist layer depending on a final mask pattern of the mask and/or mask type (for example, binary mask, phase shift mask, or EUV mask), such that an image is projected onto the resist layer that corresponds with the final mask pattern. This image is referred to herein as a projected wafer image 50. Since the resist layer is sensitive to radiation energy, exposed portions of the resist layer chemically change, and exposed (or non-exposed) portions of the resist layer are dissolved during the developing process depending on characteristics of the resist layer and characteristics of a developing solution used in the developing process. After development, the patterned resist layer includes a resist pattern that corresponds with the final mask pattern. An after development inspection (ADI) 55 can be performed to capture information associated with the resist pattern, such as critical dimension uniformity (CDU) information, overlay information, and/or defect information.

Transferring the resist pattern defined in the patterned resist layer to the wafer material layer is accomplished in numerous ways, such that a final wafer pattern 60 is formed in the wafer material layer. For example, the wafer making process can include performing an implantation process to form various doped regions/features in the wafer material layer, where the patterned resist layer is used as an implantation mask during the implantation process. In another example, the wafer making process can include performing an etching process that removes portions of the wafer material layer, where the etching process uses the patterned resist layer as an etch mask during the etching process. After the implantation process or the etching process, the lithography process includes removing the patterned resist layer from the wafer, for example, by a resist stripping process. In yet another example, the wafer making process can include performing a deposition process that fills openings in the patterned resist layer (formed by the removed portions of the resist layer) with a dielectric material, a semiconductor material, or a conductive material. In such implementations, removing the patterned resist layer leaves a wafer material layer that is patterned with a negative image of the patterned resist layer. An after etch inspection (AEI) is performed to capture information, such as critical dimension uniformity (CDU), associated with the final wafer pattern 60 formed in the wafer material layer.

Ideally, final wafer pattern 60 matches a target wafer pattern provided by IC design layout 35. However, due to various factors associated with the mask making process and the wafer making process, the final mask pattern formed on the mask often varies from the mask pattern (generated from IC design layout 35 for the target wafer pattern), causing final wafer pattern 60 formed on the wafer to vary from the target wafer pattern. For example, mask writing blur (such as e-beam writing blur) and/or other mask making factors cause variances between the final mask pattern and the mask pattern, which causes variances between final wafer pattern 60 (fabricated using the mask having the final mask pattern) and the target wafer pattern. Various factors associated with the wafer making process (such as resist blur, mask diffraction, projection imaging resolution, acid diffusion, etching bias, and/or other wafer making factors) further exacerbate the variances between final wafer pattern 60 and the target wafer pattern. The following discussion proposes various optimization techniques for enhancing the mask masking process and the wafer making process, thereby minimizing variances between final wafer pattern 60 and the target wafer pattern and enhancing lithography printability.

Figure 2:
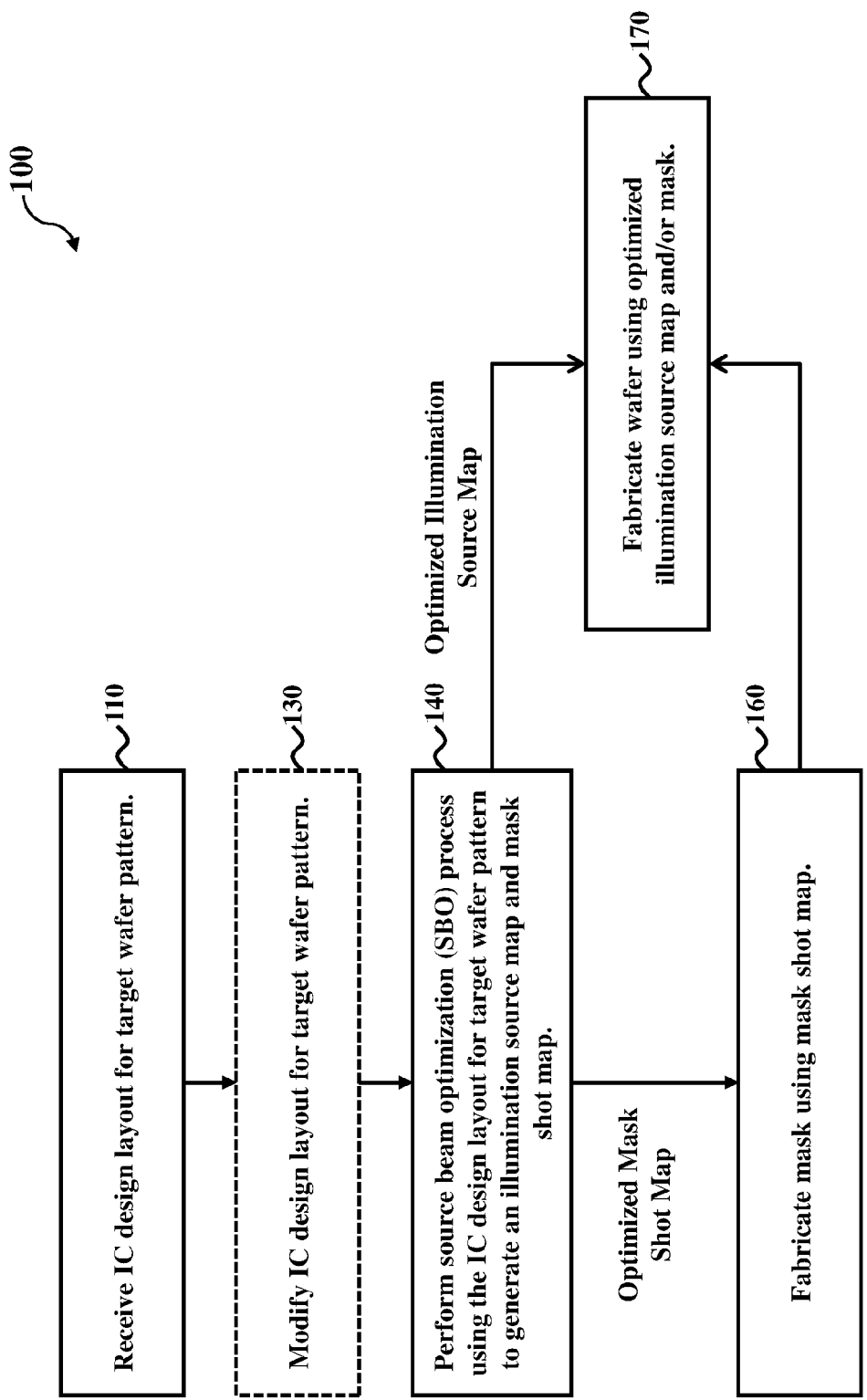
FIG. 2 is a flowchart of a method for fabricating an IC, which can be implemented by IC manufacturing system of FIG. 1, according to various aspects of the present disclosure.

FIG. 2 is a flowchart of a method 100 for fabricating an integrated circuit (IC), which can be implemented by IC manufacturing system 10 of FIG. 1, according to various aspects of the present disclosure. Design house 15, mask house 20, and/or IC manufacturer 25 can perform method 100. In some implementations, design house 15, mask house 20, and/or IC manufacturer 25 collaborate to perform method 100. At block 110, method 100 includes receiving an IC design layout, such as IC design layout 35, for a target wafer pattern. The IC design layout is presented in one or more data files having information of the target pattern. For example, the IC design layout is received in a GDSII file format or an OASIS file format. The IC design layout includes various circuit patterns (represented by geometrical shapes) designed for an IC product based on specifications of an IC product to be manufactured. The circuit patterns correspond to geometrical patterns formed in various material layers (such as metal layers, dielectric layers, and/or semiconductor layers) that combine to form IC features of the IC product. For example, a portion of the IC design layout includes various IC features to be formed in a substrate (for example, a silicon substrate) and/or in various material layers disposed on the substrate. FIG. 3 is a schematic diagrammatic view of an IC design layout 120 according to various aspects of the present disclosure. The IC design layout 120 includes various geometrical patterns that represent IC features (also referred to as main features), such as an IC feature 122, an IC feature 124, an IC feature 126, and an IC feature 128. The main features in the IC design layout 120 constitute a portion of an IC device, such as IC device 30, that is to be formed or defined in a material layer of a wafer. Each main feature represents an active region, a gate feature (for example, a gate electrode), a source region/feature and a drain region/feature, an interconnection feature, a bonding pad feature, or other IC features.

Turning again to FIG. 2, at block 130, method 100 can include modifying the IC design layout for the target wafer pattern, thereby generating a modified IC design layout for the target wafer pattern. In some implementations, dummy features are added to the IC design layout, such as IC design layout 120, to optimize a final wafer pattern fabricated on a wafer during IC fabrication. FIG. 4 is a schematic diagrammatic view of an IC design layout, such as IC design layout 120, after undergoing a modification (optimization) process according to various aspects of the present disclosure. In FIG. 4, dummy features 132 are inserted into IC design layout 120. In some implementations, dummy features 132 are added to IC design layout 120 to tune local pattern densities, such that pattern density varies less from location to location, thereby reducing processing variations (for example, by providing polishing uniformity, etching uniformity, and/or thermal annealing uniformity) and/or other unexpected effects (such as mechanical stress). For example, IC design layout 120 can include a target wafer pattern that defines various active regions to be formed on a wafer. The active regions can be defined on the wafer by forming a patterned layer over the wafer (for example, implementing a lithography exposure and development process to form a patterned resist layer over the wafer), forming trenches in the wafer (for example, etching the wafer using the patterned resist layer as an etch mask), filling the trenches with a dielectric material, and performing a CMP process to form isolation features that define the active regions of the wafer. The CMP process, which removes excessive dielectric material and planarizes a top surface of the wafer, often introduces dishing and/or erosion effects. Dummy features 132 added to IC design layout 120 can tune a pattern density, thereby reducing such side effects and improving CMP process results. In another example, where IC design layout 120 includes a target wafer pattern that defines source/drain features to be formed on a wafer, dummy features 132 can be added to IC design layout 120 to reduce thermal annealing variations from location to location, thereby improving a thermal annealing process (implemented, for example, to activate ion implanted dopants) applied to the wafer. In yet another example, where IC design layout 120 includes a target wafer pattern that defines conductive lines of an interconnection structure, dummy features 132 can be added to IC design layout 120 in various regions of the wafer, such as die-corner-circuit-forbidden regions, to relieve corner chip stresses. Other features may be added to IC design layout 120 in appropriate locations, such as in frame regions of the wafer. Such features include mask identification numbers (for example, barcodes), alignment marks, test patterns, other features, or combinations thereof depending on various IC fabrication usages and/or considerations.

Turning again to FIG. 2, at block 140, method 100 includes performing a source beam optimization (SBO) process using the IC design layout for the target wafer pattern (which is received at block 110 or generated at block 130) to generate a mask shot map and an illumination source map. The mask shot map is associated with a mask making process, where the mask shot map defines an exposure pattern for printing (writing) a final mask pattern on a mask during the mask making process. The final mask pattern corresponds with a mask pattern that is based on the target wafer pattern of the IC design layout. The exposure pattern can define mask shot information for each mask region (also referred to as mask feature or mask polygon) of the mask pattern. In some implementations, mask shot information includes exposure dose (energy) and/or exposure shape required for printing a respective mask feature of the mask pattern. In some implementations, mask shot information may define more than one mask shot (exposure shot) for a mask feature, which defines exposure dose (energy) and/or exposure shape. In contrast, the illumination source map is associated with a wafer making process, where the illumination source map defines illumination source optics for illuminating a mask when printing a final wafer pattern on a wafer during the wafer making process. The final wafer pattern corresponds with the final mask pattern, such as an image of the final mask pattern projected onto the wafer under the illumination source optics. The illumination source optics can define illumination information, such as an illumination source shape, which represents a distribution of angles of radiation falling on a mask and/or wafer. In some implementations, the illumination source map can define geometric shapes (for example, annular, quadrapole, or dipole) representing a distribution of angles of radiation. For ease of discussion, block 140 is generally referred to hereinafter as SBO process 140.

Figures 5, 6:
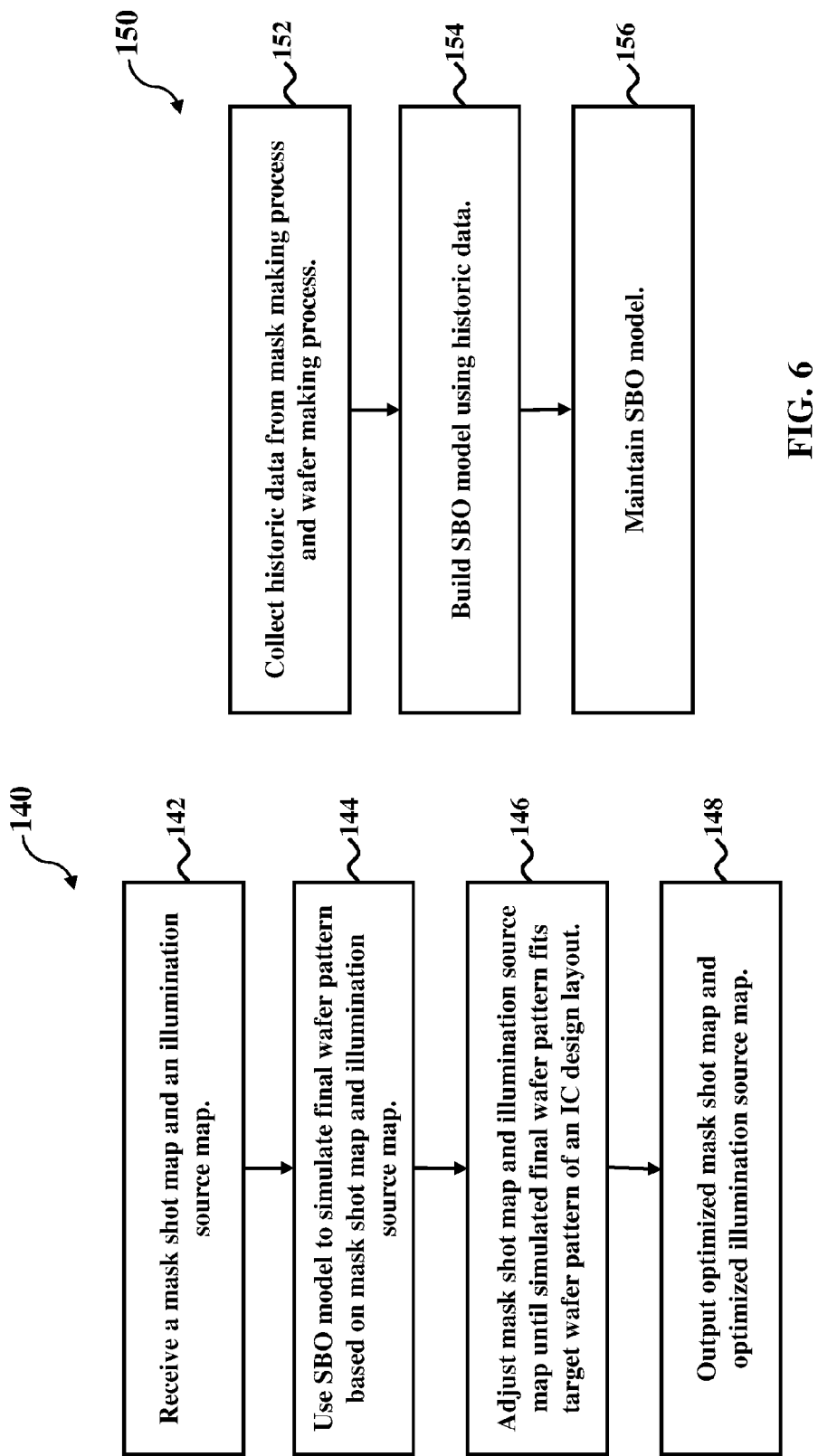
FIG. 5 is a flowchart of a source beam optimization (SBO) method for generating a mask shot map and an illumination source map, which can be implemented in the method of FIG. 2, according to various aspects of the present disclosure.
FIG. 6 is a flowchart of a method for building an SBO model, which can be implemented in the method of FIG. 5, according to various aspects of the present disclosure.

FIG. 5 is a flowchart of SBO process 140, which can be implemented in method 100, according to various aspects of the present disclosure. At block 142, SBO process 140 includes receiving a mask shot map and an illumination source map. In some implementations, the mask shot map and/or the illumination map are generated based on historical data and/or simulated data associated with mask making processes and/or wafer making processes, such as those used to generate a target wafer pattern defined by the IC design layout. At block 144, an SBO model is used to simulate a final wafer pattern based on the mask shot map and the illumination source map. For example, the SBO model predicts the final wafer pattern by collectively simulating (1) a mask making process that uses the mask shot map to fabricate a mask and (2) a wafer making process that uses the illumination source map (and, in some implementations, the mask fabricated using the mask shot map). At block 146, SBO process 140 adjusts (tunes) the mask shot map and the illumination source map until the simulated final wafer pattern fits a target wafer pattern of an IC design layout, such as that received at block 110 or generated at block 130. In some implementations, an exposure pattern of the mask shot map is tuned (adjusted), and illumination source optics defined by the illumination source map are tuned (adjusted), such as individual exposure doses and/or individual exposure shapes. In some implementations, various parameters associated with the wafer making process and the mask making process remain fixed, while SBO process 140 varies exposure conditions associated with the mask making process and the wafer making process. At block 148, SBO process 140 outputs an optimized mask shot map and an optimized illumination source map. In some implementations, a mask making process uses the optimized mask shot map to fabricate a mask. In some implementations, during the wafer making process, the wafer making process uses the optimized illumination source map to illuminate the mask fabricated from the optimized mask shot map. Additional steps can be provided before, during, and after SBO process 140, and some of the steps described can be moved, replaced, or eliminated for additional embodiments of SBO process 140.

Considering FIG. 2 and FIG. 5, SBO process 140 and its associated SBO model are further described according to various aspects of the present disclosure. SBO process 140 is a model-based process that tunes (adjusts) a given mask shot map $m_f$ and a given illumination source map S according to an SBO model that minimizes (or eliminates) any differences between a desired target wafer pattern (T) (in some implementations, a set of desired target wafer patterns T) and a predicted final wafer pattern P (in some implementations, a set of simulated final wafer patterns P). In particular, through an iterative process, the SBO model optimizes mask shot map $m_f$ and illumination source map S using an optimization (minimization) problem that minimizes a difference between predicted final wafer pattern P and target wafer pattern T:

$$\min_{S,m_f} \|P - T\|, \qquad \text{Equation (1)}$$

where target wafer pattern T is defined by the IC design layout (or IC design layouts) received at block 110 and/or block 130 (though the present disclosure contemplates other sources for target wafer pattern T) and predicted final wafer pattern P is generated by the SBO model collectively simulating (1) a mask making process that uses mask shot map $m_f$ to fabricate a mask and (2) a wafer making process that uses illumination source map S (and, in some implementations, the mask fabricated using mask shot map $m_f$). During the iterative process, the SBO model compares predicted (simulated) final wafer pattern P to target wafer pattern T, tuning (adjusting) mask shot map $m_f$ and illumination source map S until predicted final wafer pattern P is best fits target wafer pattern T. In some implementations, predicted final wafer pattern P matches target wafer pattern T when a simulated final wafer pattern contour matches a target wafer pattern contour, or when any difference therebetween is less than a defined tolerance range. SBO process 140 thus co-optimizes mask shot map $m_f$ and illumination source map S, such that predicted final wafer pattern P matches target wafer pattern T.

Predicted final wafer pattern P can be represented two-dimensionally in an x-dimension and a y-dimension by predicted final wafer pattern P(x,y), where predicted final wafer pattern P(x,y) defines a contour of a final wafer pattern formed in a wafer material layer after simulating a wafer making process on the wafer. The simulated wafer making process includes simulating any process implemented to form a pattern in a wafer material layer, such as the lithography process described above with reference to FIG. 1. For example, the simulated wafer making process includes forming a patterned resist layer on a wafer material layer and transferring a pattern defined in the patterned resist layer to the wafer material layer. Such processing can include an exposure process, a developing process, and an etching process. In some implementations, predicted final wafer pattern P(x,y) represents a pattern formed in the wafer material layer after a resist pattern (formed in the resist layer) is transferred to the wafer material layer (for example, after an exposure process, a developing process, and an etching process). Alternatively, in some implementations, predicted final wafer pattern P(x,y) represents the resist pattern formed in the resist layer disposed on the wafer material layer (for example, after an exposure process and a developing process).

A wafer patterning function Γ defines characteristics and/or behaviors associated with the simulated wafer making process, such as the lithography process, used to form predicted final wafer pattern P(x,y). Wafer patterning function Γ can account for characteristics and/or behaviors associated with the patterned resist layer formed over the wafer (which includes a resist pattern that corresponds with a final mask pattern of the mask) and/or the patterned wafer. For example, wafer patterning function Γ simulates characteristics and/or behaviors of a patterned resist layer formed on the wafer during the lithography process, such as a response of the resist layer during a pre-exposure baking process, a response of the resist layer during an exposing process (such as characteristics and/or behaviors related to reactions of the resist layer in response to illumination (for example, radiation energy) used during the exposure process), a response of the resist layer during a post-exposure baking process, a response of the resist layer during a developing process, and/or a response of the resist layer during any other process associated with the wafer making process. Wafer patterning function Γ can further simulate characteristics and/or behaviors associated with transferring the pattern in the patterned resist layer to the wafer material layer, such as etching bias from an etching process.

Wafer patterning function Γ is a function of a projected wafer image I (in some implementations, a set of projected wafer images I), which simulates imaging of a mask on a resist layer during an exposure process associated with the lithography process. Thus, predicted final wafer pattern P(x,y) depends on projected wafer image I as expressed by:

$$P(x,y)=\Gamma(I(x,y)), \quad \text{Equation (2)}$$

where I(x,y) defines a projected wafer image having a two-dimensional profile, such as a contour, defined in an x-dimension and a y-dimension. In some implementations, an exposure process is simulated to generate projected wafer image I(x,y). The exposure process includes illuminating a mask having a final mask pattern with radiation (using an illumination source), such that an image corresponding with the final mask pattern is projected onto a resist layer. The illumination source illuminates the mask based on illumination source map S. In such implementations, projected wafer image I(x,y) is a function of illumination source map S (in some implementations, a set of illumination source maps S) and a final mask pattern m (in some implementations, a set of final mask patterns m), such that:

$$I=I(x,y)=I(S(x,y),m(x,y)), \quad \text{Equation (3)}$$

where S(x,y) represents a two-dimensional illumination source map defined in an x-dimension and a y-dimension, and m(x,y) represents a two-dimensional final mask pattern defined in the x-dimension and the y-dimension. Illumination source map S(x,y) defines illumination source optics for illuminating the mask during the simulated wafer making process, and final mask pattern m(x,y) defines a mask contour formed on the mask by the simulated mask making process. A mask patterning function (Φ) defines characteristics and/or behaviors associated with the mask making process used to simulate final mask pattern m(x,y), where the mask making process uses mask shot map $m_f$ and a corresponding mask pattern (mask layout) to form final mask pattern m(x,y), such that final mask pattern m(x,y) can be expressed as:

$$m(x,y)=\Phi(m_f(x,y)), \quad \text{Equation (4)}$$

where $m_f(x,y)$ represents a two-dimensional mask shot map defined in an x-dimension and a y-dimension. Mask shot map $m_f(x,y)$ defines an exposure pattern for fabricating the mask during the simulated mask making process, where the exposure pattern can indicate exposure doses and/or exposure shapes (for example, in the x-dimension and the y-dimension) for corresponding mask regions (or mask polygons) of the mask pattern. Thus, projected wafer image I on the wafer (in particular, on the resist layer disposed on the wafer) is a function of mask making function Φ, such that:

$$I=I(x,y)=I(S(x,y),\Phi(m_f(x,y))), \quad \text{Equation (5)}$$

and predicted final wafer pattern P can be predicted by:

$$P(x,y)=\Gamma(I(S(x,y),\Phi(m_f(x,y)))). \quad \text{Equation (6)}$$

In some implementations, where final mask pattern m(x,y) is transferred to the mask by an e-beam writing process, mask shot map $m_f(x,y)$ is an e-beam shot map that defines an e-beam exposure pattern for fabricating the mask, where the e-beam exposure pattern indicates exposure doses and/or exposure shapes for corresponding mask regions of the mask pattern.

Considering all of the above factors associated with the mask making process (associated with mask patterning function Φ) and the wafer making process (associated with projected imaging function I and wafer patterning function Γ) expressed in Equations 1-6, the SBO model's optimization (minimization) problem becomes:

$$\min_{S,m_f} \|\Gamma(I(S(x, y), \Phi(m_f(x, y))))-T\|, \quad \text{Equation (7)}$$

which minimizes a difference between predicted final wafer pattern P and target wafer pattern T by adjusting mask shot map $m_f$ and illumination source map S. SBO process 140 then uses the SBO model in the optimization (minimization) problem to vary illumination source map S (in other words, vary illumination conditions of the wafer making process) and mask shot map (vary exposure conditions of the mask making process) to best fit predicted wafer pattern P to target wafer pattern T.

In some implementations, the SBO model simulates the mask making process assuming that illumination source S is represented by a rectangular array and mask shot map $m_f$ is represented by a sum of mask shots p (for example, a sum of e-beam shots), such that mask pattering function Φ can be represented by a convolution operation ⊗ and final mask pattern m(x,y) is expressed as:

$$m(x, y) =$$
$$\Phi(m_f(x, y)) = \Phi\left(\sum_{i=1}^{q} p_i(x, y)\right) = \sum_{i=1}^{q} p_i(x, y) \otimes G(x, y), \quad \text{Equation (8)}$$

where q represents a number of mask regions (also referred to as mask polygons or mask features) of the mask pattern (mask layout), $p_i$ is mask shot information for an ith mask region of the mask pattern defined two-dimensionally in an x-dimension and a y-dimension, and G(x,y) is a Green's function that represents mask making behavior and/or mask making characteristics associated with the mask pattern. Mask shot $p_i$ can include exposure dose and/or exposure shape information. In such implementations, the SBO optimization (minimization) problem becomes:

$$\min_{S,m_f} \left\| \Gamma(I(S(x, y), \sum_{i=1}^{q} p_i(x, y) \otimes G(x, y) - T \right\|, \quad \text{Equation (9)}$$

which minimizes a difference between predicted final wafer pattern P and target wafer pattern T by adjusting mask shot information including exposure dose and/or exposure shape (and thus generating mask shot map $m_f$) and illumination source map S. In some implementations, SBO minimizes any differences between predicted final wafer pattern P and target wafer pattern T using a subset of the q mask regions of the mask pattern.

In some implementations, the SBO model simulates predicted final wafer pattern P using a resist model (RM), such that predicted final wafer pattern P is simulated by:

$$P(x,y)=\Gamma(I(x,y),RM), \quad \text{Equation(10)}$$

where resist model RM models resist image formation. In some implementations, resist model RM represents resist behavior and/or resist characteristics associated with the resist layer on which projected wafer image I(x,y) is formed during the wafer making process. In such implementations, the SBO optimization (minimization) problem becomes:

$$\min_{S,m_f} \left\| \Gamma(I(S(x, y), \sum_{i=1}^{q} p_i(x, y) \otimes G(x, y), RM - T \right\|, \quad \text{Equation (11)}$$

which minimizes a difference between predicted final wafer pattern P and target wafer pattern T by adjusting mask shot information including exposure dose and/or exposure shape (and thus generating mask shot map $m_f$) and illumination source map S. In some implementations, when using resist model RM, SBO minimizes any differences between predicted final wafer pattern P and target wafer pattern T using a subset of the q mask regions of the mask pattern.

During SBO process 140, the minimization process can implement a cost function (also referred to as a loss function) to minimize a difference between target wafer pattern T and predicted final wafer pattern P. For example, in some implementations, a cost function is defined according to an edge placement error, where SBO process 140 optimizes mask shot map $m_f$ and illumination source map S using an optimization problem that minimizes a sum of edge placement errors between predicted final wafer pattern P and target wafer pattern T:

$$\min_{S,m_f} \left\{ \sum_{j=1}^{n} \|EPE(x_j, y_j)\| \right\}. \quad \text{Equation (12)}$$

In Equation (12), where target wafer pattern T and predicted final wafer pattern P have n corresponding locations (points), an edge placement error function (EPE) defines a difference between an edge of target wafer pattern T and an edge of predicted final wafer pattern P at a $j^{th}$ corresponding location given by a respective x-coordinate ($x_j$) and a respective y-coordinate ($y_j$). In some implementations, the EPE-based optimization problem (Equation (12)) minimizes a sum of edge placement errors over a subset of the n corresponding locations. In another example, in some implementations, a cost function is defined according to an area difference, where SBO process 140 optimizes mask shot map $m_f$ and illumination source map S to minimize a sum of area differences between predicted final wafer pattern P and target wafer pattern T:

$$\min_{S,m_f} \left\{ \sum_{k=1}^{m} \|\Delta \text{Area}(P_k - T_k)\| \right\}. \quad \text{Equation (13)}$$

In Equation (13), where target wafer pattern T and predicted final wafer pattern P have m corresponding regions (or corresponding polygons), an area function (ΔArea) defines a difference between an area of a $k^{th}$ corresponding region (or a $k^{th}$ corresponding polygon) of target wafer pattern T and predicted final wafer pattern P. In some implementations, the area difference based optimization problem (Equation (13)) minimizes a sum of area differences over a subset of the m corresponding regions (or corresponding polygons).

The SBO model is built using historic data from mask making processes and wafer making processes. Various behaviors associated with the SBO model (such as mask patterning function Φ, projected imaging function I, and wafer patterning function Γ) can be individually or collectively calibrated depending on IC design and manufacturing considerations. Alternatively, in some implementations, the SBO model is built using simulated data for mask making processes and wafer making processes. FIG. 6 is a flowchart of a method 150 for generating an SBO model, such as the SBO model described with reference to FIG. 2 and FIG. 5, according to various aspects of the present disclosure. In some implementations, method 150 is implemented by an entity of IC manufacturing system 10 of FIG. 1, such as mask house 20. Additional steps can be provided before, during, and after method 150, and some of the steps described can be moved, replaced, or eliminated for additional embodiments of method 150.

At block 152, method 150 includes collecting historic data from a mask making process and a wafer making process. In some implementations, historic mask making process data includes data associated with mask writing processes (such as e-beam writing processes) and/or etching processes used to form final mask patterns in masks, where the final mask patterns correspond with mask patterns generated from IC design layouts for target wafer patterns. In furtherance of such implementations, the historic mask making process data can be collected from a corresponding lithography process (such as an e-beam lithography process) and/or an etch process. In some implementations, historic wafer making process data includes data from lithography processes used to form final wafer patterns in wafers, where the final wafer patterns correspond with the final mask patterns. In furtherance of such implementations, the historic wafer making process data can be collected from a corresponding lithography process, an etch process, and/or an ion implantation process.

At block 154, method 150 builds an SBO model using the historic data of the mask making process and the wafer making process. Any suitable procedure is implemented for effectively building the SBO model. In some implementations, the SBO model is built by constructing a single mathematical model that collectively simulates the mask making process and the wafer making process as a function of a given mask shot map and a given illumination source map, and determining coefficients or other parameters for the mathematical model using the historic data (for example, by performing a least squares fit). In some implementations, the SBO model is constructed according to various inputs, such as theoretical analysis of mask making processes and wafer making processes, empirical formulas, engineering inputs, other suitable inputs, or combinations thereof.

At block 156, method 150 can maintain the SBO model. Since the SBO model simulates a mask making process and a wafer making process, the SBO model is a function of both mask making processes, wafer making processes, and corresponding mask making and wafer making systems and/or tools (for example, electron-beam lithography system/tool, optical lithography system/tool, etching system/tool, and so on). The mask making process and the wafer making process may change over time due to various factors (for example, chemical lifetime or characteristics of chemical batches associated with lithography processes). The corresponding mask making tools and wafer making tools may also change over time (for example, different calibration settings or during extended times between calibrations). Accordingly, as method 150 continuously collects historic data from the mask making processes and the wafer making processes at block 152, SBO model can be adjusted based on recently collected historic IC fabrication data. For example, recently collected historic IC fabrication data can be implemented to determine (adjust) coefficients of the SBO model to compensate for shifts (changes) in the mask making process and the wafer making process. In some implementations, the SBO model is updated at a given frequency. In some implementations, updating the SBO model is triggered when shifts in the mask making process and wafer making processes are observed (for example, from statistical process control charts).

Returning to FIG. 2, method 100 can continue at block 160, where a mask is fabricated using an optimized mask shot map, such as optimized mask shot map $m_f$ generated by SBO process 140. The mask includes a mask substrate and a patterned mask layer, which is designed based on various mask technologies. For example, mask house 20 of IC manufacturing system 10 can implement a mask making process, described in detail above with reference to FIG. 1, using the optimized mask shot map to form the patterned mask layer. In some implementations, an e-beam lithography system (also referred to as an e-beam writer or an e-beam writer system) performs an e-beam lithography process to pattern a mask with a final mask pattern, where the final mask pattern corresponds with the target pattern of the IC design layout. The e-beam lithography process can include forming an e-beam sensitive resist layer over a mask material layer, and exposing the e-beam sensitive resist layer by scanning an e-beam across the e-beam sensitive resist layer based on the optimized mask shot map (generated by SBO process 140). During the exposing process, a dose and/or shape of each e-beam exposure shot (mask shot) for forming respective mask features can be tuned based on the optimized mask shot map. Exposed portions of the e-beam sensitive resist layer chemically change, enabling selective removal of exposed or non-exposed portions of the e-beam sensitive resist layer during a developing process, and thereby forming a patterned e-beam sensitive resist layer. The e-beam lithography process can further include performing an etching process that uses the patterned e-beam sensitive resist layer as an etch mask to remove portions of the mask material layer (such as an opaque layer, a phase shifting material layer, an absorption layer, or a portion of a mask substrate), thereby forming a final mask pattern in the mask material layer by transferring a pattern defined in the patterned e-beam sensitive resist layer to the mask material layer. The patterned e-beam sensitive resist layer can then be removed, for example, by a resist stripping process. Alternatively, in some implementations, the e-beam lithography process directly writes the final mask pattern to the mask material layer based on the optimized mask shot map, omitting the processing involved with the e-beam sensitive resist layer.

Figure 7:
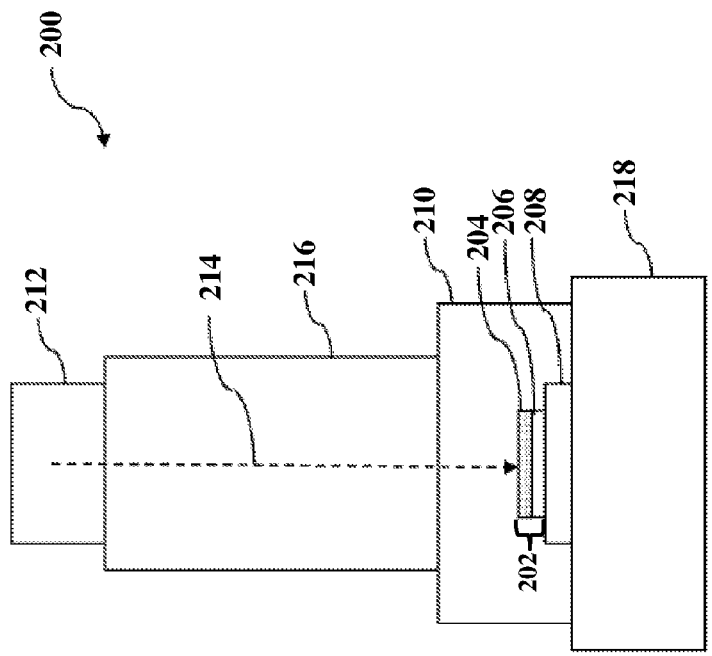
FIG. 7 is a simplified block diagram of an e-beam writer according to various aspects of the present disclosure.

FIG. 7 is a simplified block diagram of an e-beam writer 200, which can be implemented for fabricating masks at block 160, according to various aspects of the present disclosure. Based on an optimized mask shot map (such as that generated by SBO process 140 of method 100), e-beam writer 200 can fabricate a mask 202 by writing an IC pattern on an e-beam sensitive resist layer 204 formed on a mask substrate 206. In some implementations, e-beam writer 200 receives the optimized mask shot map in the form of a pattern writing instruction set (for example, from a pattern generator). In FIG. 7, mask 202 is positioned on a stage 208 within a chamber 210. An e-beam source 212 generates an electron beam(s) 214. In some implementations, e-beam source 212 is an electron gun with an electron generating mechanism (for example, thermal electron emission). In a particular example, the electron gun includes a tungsten (or other suitable material) filament designed and biased to thermally emit electrons. Electron beam 214 is directed and positioned on mask 202 (in particular, e-beam sensitive resist layer 204) by an e-beam column 216. In some implementations, e-beam column 216 includes lenses for focusing electrons generated by e-beam source 212 to achieve desired imaging effect (for example, electrostatic lenses and/or electromagnetic lenses), apertures for defining a shape and/or distribution of electron beam 214, a deflection system for scanning electron beam 214 across mask 202 (for example, in a vector mode or a raster mode), and other e-beam column components. In some implementations, e-beam source 212 is considered a portion of e-beam column 216. In some implementations, the deflection system is a scanner that magnetically (for example, using conductive coils) or electrostatically (for example, using conductive plates) deflects electron beam 214 in two orthogonal directions, such that electron beam 214 is scanned over a surface of mask 202, such as a surface of e-beam sensitive resist layer 204. A pump unit 218 can generate a vacuum environment or other suitable environment in chamber 210 during an e-beam lithography process. FIG. 7 has been simplified for the sake of clarity to better understand the inventive concepts of the present disclosure. Additional features can be added in e-beam writer 200, and some of the features described below can be replaced or eliminated for additional embodiments of e-beam writer 200.

Returning to FIG. 2, other processing steps may follow after fabricating the mask. For example, at block 160, method 100 includes fabricating a wafer. At block 170, method 100 includes fabricating a wafer using an optimized illumination source map (generated by the SBO process at block 140) and/or optimized mask (generated by the mask making process at block 160). For example, IC fab 25 of IC manufacturing system 10 can implement a wafer making process, described in detail above with reference to FIG. 1, using the optimized illumination source map to form a patterned wafer material layer. In some implementations, a lithography system performs a lithography process to pattern a wafer material layer with a final wafer pattern, where the final wafer pattern corresponds with the target pattern of the IC design layout. The lithography process can include forming a resist layer on the wafer material layer (for example, by spin coating), and exposing the resist layer by illuminating a mask (such as the mask fabricated at block 160) based on the optimized illumination source map (generated by SBO process 140). During the exposure process, illumination source optics are configured to illuminate the mask with radiation energy (such as UV light, DUV light, or EUV light). Various components of the lithography system can be tuned to configure the illumination source optics as defined by an illumination source map. The mask blocks radiation from and/or transmits radiation to the resist layer depending on a type of the mask (for example, binary mask, phase shift mask, or EUV mask), a final mask pattern of the mask, and the illumination source optics used to illuminate the mask with the radiation energy, such that an image is projected onto the resist layer that corresponds with the final mask pattern. Exposed portions of the resist layer chemically change, enabling selective removal of exposed or non-exposed portions of the resist layer during a developing process, and thereby forming a patterned resist layer. The lithography process can further include performing an etching process that uses the patterned resist layer as an etch mask to remove portions of the wafer material layer (such as a dielectric material layer, a semiconductor material layer, a conductive material layer, or a portion of a wafer substrate), thereby forming a final wafer pattern in the wafer material layer by transferring a pattern defined in the patterned resist layer to the wafer material layer. The patterned resist layer can then be removed, for example, by a resist stripping process.

Figure 8:
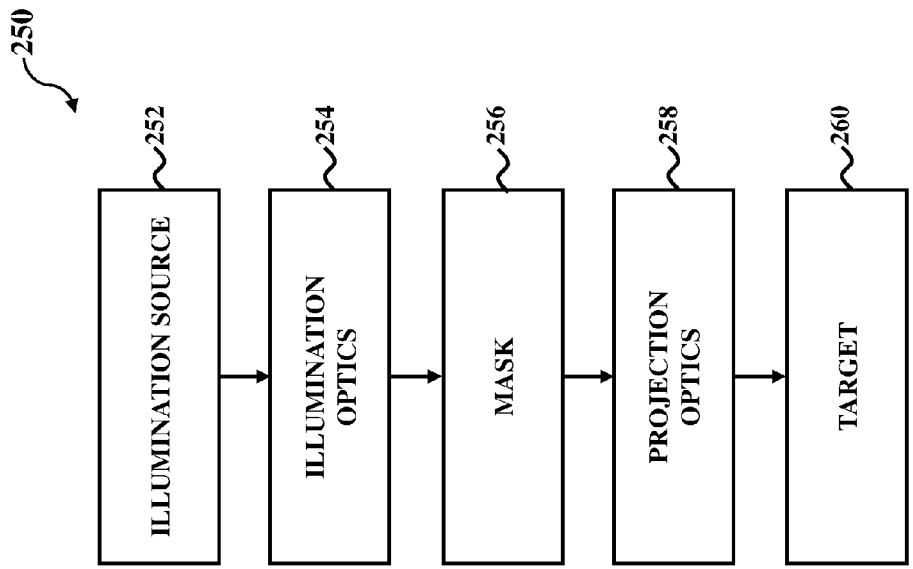
FIG. 8 is a simplified block diagram of a lithography system according to various aspects of the present disclosure.

FIG. 8 is a simplified block diagram of a lithography system 250, which can be implemented for fabricating wafers at block 170, according to various aspects of the present disclosure. Based on an optimized illumination source map (such as that generated by SBO process 140 of method 100), lithography system 250 can fabricate a wafer forming an IC pattern on a wafer material layer. In some implementations, lithography system 250 receives optimized illumination source map in the form of an illumination source optics instruction set. In FIG. 8, lithography system 250 includes an illumination source 252, illumination optics 254, a mask 256, projection optics 258, and a target 260 such as a semiconductor wafer on a substrate stage. Illumination source 252 emits radiation of a suitable wavelength, such as UV radiation, DUV radiation, or EUV radiation. In some implementations, illumination source 252 can include a mercury lamp for providing UV radiation, such as 436 nm (G-line) and 365 nm (I-line). In some implementations, illumination source 252 can include an excimer laser for providing DUV radiation, such as 248 nm, 193 nm and 157 nm. An example of excimer laser includes a krypton fluoride (KrF) excimer laser, an argon fluoride (ArF) excimer laser, or a fluoride ($F_2$) excimer laser. Illumination optics 254 collect, guide, and direct the radiation emitted by illumination source 252 to mask 256. In some implementations, illumination source 252 and illumination optics 254 are configured based on the optimized illumination source map (for example, generated by SBO process 140). Mask 256 transmits, absorbs, and/or reflects the radiation depending on a final mask pattern of mask 256, along with mask technologies used to fabricate mask 256, thereby providing patterned radiation. In some implementations, mask 256 is a mask fabricated by method 100 at block 160, which uses a mask shot map generated by SBO process 140. Projection optics 258 collect, guide, and direct the patterned radiation to target 260, such that an image of mask 256 (corresponding with the final mask pattern) is projected onto target 260. Illumination optics 254 and projection optics 258 include refractive optics (such as one or more lenses), reflective optics (such as one or more mirrors), and/or any other illumination/projection components for facilitating illumination optics 254 and projection optics 258 in collecting, guiding, and directing radiation from illumination source 252 to target 260. In some implementations, apertures of various lenses of illumination optics 254 can be adjusted based on the optimized illumination source map. Target 260 includes a wafer having a radiation sensitive layer (for example, a resist layer) disposed thereover, where portions of the radiation sensitive layer exposed to the radiation chemically change. Target 260 may be held on a wafer stage, which provides control of a position of target 260 within lithography system 250, such that an image of mask 256 can be scanned onto target 260 in a repetitive fashion (though other lithography methods are possible). Lithography system 250 can include additional items depending on implemented lithography process technologies. FIG. 8 has been simplified for the sake of clarity to better understand the inventive concepts of the present disclosure. Additional features can be added in lithography system 250, and some of the features described below can be replaced or eliminated for additional embodiments of lithography system 250.

Figure 9A:
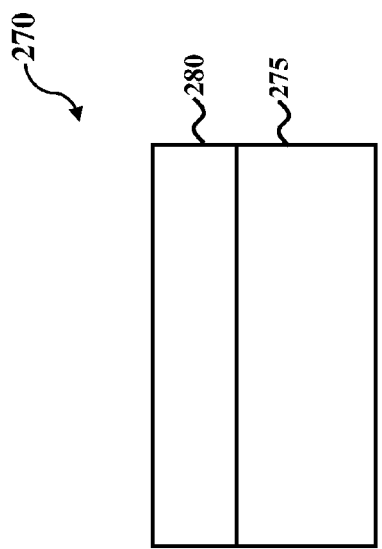
FIGS. 9A-9D are fragmentary diagrammatic views of a semiconductor wafer, in portion or entirety, at various wafer fabrication stages according to various aspects of the present disclosure.
Figure 9B:
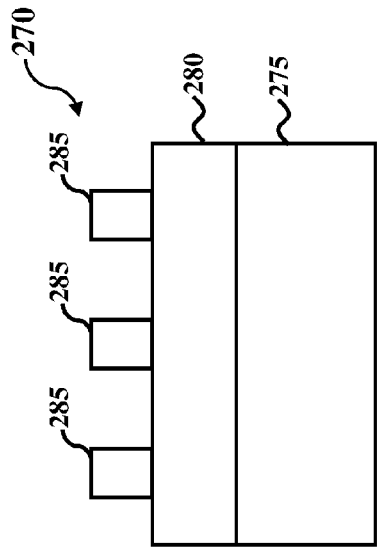
Figure 9C:
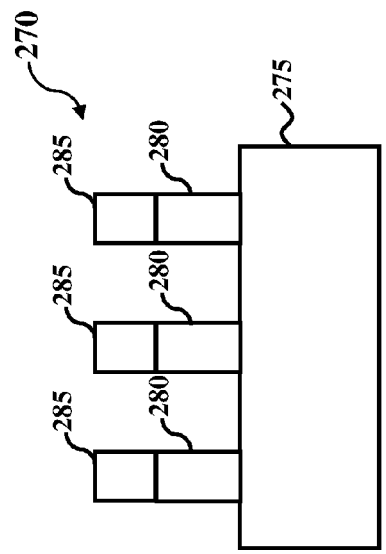
Figure 9D:
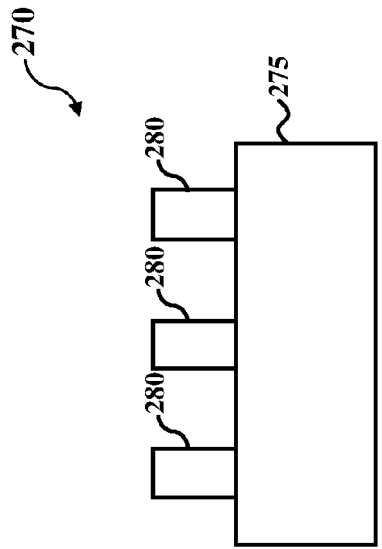

FIGS. 9A-9D are fragmentary diagrammatic views of a semiconductor wafer 270, in portion or entirety, at various wafer fabrication stages, such as those associated with block 170 of method 100, according to various aspects of the present disclosure. In FIG. 9A, semiconductor wafer 270 includes a semiconductor substrate 275, such as a silicon substrate. Alternatively or additionally, semiconductor substrate 275 includes other semiconductor materials, such as germanium, silicon germanium, silicon carbide, or gallium arsenide. A wafer material layer 280 is formed over semiconductor substrate 275. In some implementations, wafer material layer 280 is a dielectric layer, a semiconductor layer, or a conductive layer. Depending on wafer fabrication stage, semiconductor wafer 270 can include various material layers (for example, dielectric material layers, semiconductor material layers, and/or conductive material layers) and/or IC features (for example, doped regions/features, gate features, and/or interconnect features) when undergoing the wafer making process. The wafer making process patterns wafer material layer 280 using a lithography process, which can include a resist coating process, an exposure process, and a developing process as described in detail herein. In FIG. 9B, a lithography patterning process forms a patterned resist layer 285 over wafer material layer 280. In some implementations, the lithography patterning process includes exposing a resist layer in a lithography system (such as lithography system 250 of FIG. 8) using a mask fabricated using an optimized mask shot map, such as the mask fabricated at block 160 of method 100. The wafer making process can continue by transferring a pattern defined in patterned resist layer 285 to wafer material layer 280. For example, in FIG. 9C, an etching process is performed that removes portions of wafer material layer 280 using patterned resist layer as an etch mask. In FIG. 9D, the patterned resist layer may be removed by resist stripping process. FIGS. 9A-9C have been simplified for the sake of clarity to better understand the inventive concepts of the present disclosure. Additional features can be added in semiconductor wafer 270, and some of the features described below can be replaced, modified, or eliminated in other embodiments of semiconductor wafer 270.

Figure 10:
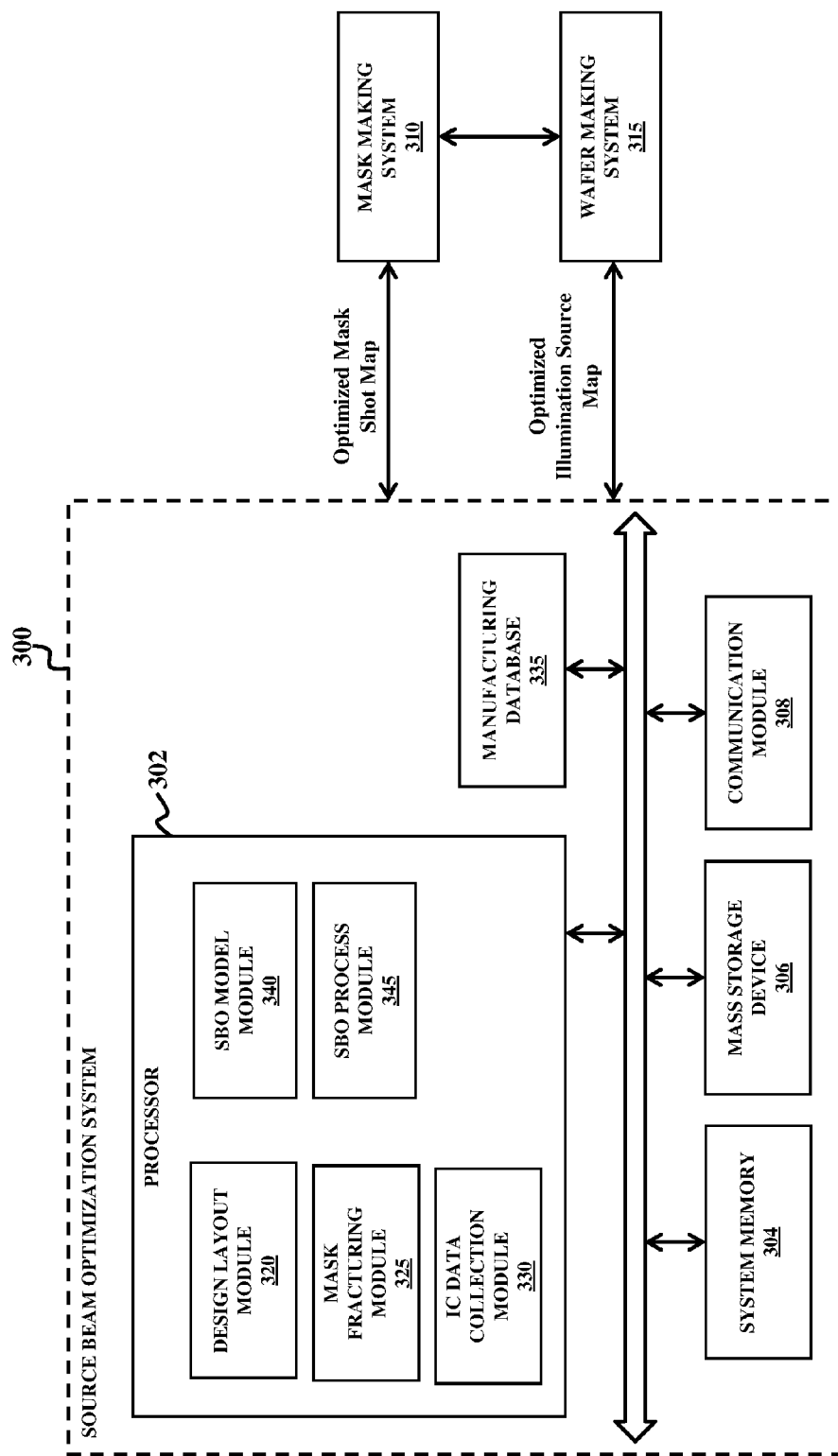
FIG. 10 is a simplified block diagram of an SBO system, which can be implemented by the IC manufacturing system of FIG. 1, according to various aspects of the present disclosure.

FIG. 10 is a simplified block diagram of a source beam optimization (SBO) system 300, which can be implemented by IC manufacturing system 10 of FIG. 1, according to various aspects of the present disclosure. In some implementations, mask house 20 implements SBO system 300, where SBO system 300 is operable to perform functionalities described in association with mask data preparation 40 of FIG. 1. SBO system 300 includes both hardware and software integrated to perform various operations and/or functions for generating a mask shot map and an illumination source map, as described herein. In some implementations, an SBO process, such as SBO process 140, may be implemented as software instructions executing on SBO system 300. FIG. 10 has been simplified for the sake of clarity to better understand the inventive concepts of the present disclosure. Additional features can be added in SBO system 300, and some of the features described below can be replaced or eliminated for additional embodiments of SBO system 300.

SBO system 300 includes a processor 302 that is communicatively coupled to a system memory 304, a mass storage device 306, and a communication module 308. System memory 304 provides processor 302 with non-transitory, computer-readable storage to facilitate execution of computer instructions by processor 302. Examples of system memory 304 include random access memory (RAM) devices, such as dynamic RAM (DRAM), synchronous DRAM (SDRAM), solid state memory devices, and/or a variety of other memory devices. Computer programs, instructions, and data are stored on mass storage device 306. Examples of mass storage device 306 include hard discs, optical disks, magneto-optical discs, solid-state storage devices, and/or a variety of other mass storage devices. Communication module 308 is operable to communicate information with various components of IC manufacturing entities, such as design house 15, mask house 20, and IC fab 25 of IC manufacturing system 10. In FIG. 10, communication module 308 allows SBO system 300 to communicate with a mask making system 310 (such as e-beam lithography system 200 of FIG. 7) and a wafer making system 315 (such as lithography system 250 of FIG. 8). Communication module 308 includes Ethernet cards, 802.11 WiFi devices, cellular data radios, and/or other communication devices for facilitating communication of SBO system 300 with IC manufacturing entities.

SBO system 300 further includes an IC design layout module 320, a mask fracturing module 325, an IC data collection module 330, an IC manufacturing database 335, an SBO model module 340, and an SBO process module 345, which are communicatively coupled to carry out an SBO process (such as SBO process 140). In operation, IC design layout module 320 receives an IC design layout for a target wafer pattern (for example, from design house 15) and prepares the IC design layout for an SBO process. In some implementations, IC design layout module 320 modifies the IC design layout for the target wafer pattern, such as described above with reference to block 130 of method 100 (FIG. 2). In some implementations, IC design layout module 320 extracts portions of the IC design layout, such that the SBO process is performed using selected portions of the IC design layout, which can significantly increase the speed of the SBO process. IC data collection module 330 is configured to collect, store, and maintain IC manufacturing data, such as data from mask making processes associated with mask making system 310 and wafer making processes associated with wafer making system 315. The IC manufacturing data can be stored in IC manufacturing database 335. In some implementations, IC data collection module 330 analyzes the collected IC manufacturing data. In some implementations, analyzing the collected IC manufacturing data can include filtering out low quality IC manufacturing data (such as data deemed not reliable) and/or consolidating the manufacturing data into useful statistical IC manufacturing information (such as averaging). In some implementations, for illustration purposes only, the collected IC manufacturing data includes e-beam blur information, resist characteristic information (such as CDs associated with resist patterns after developing processes), etching bias information (such as CDs of wafer patterns after etching processes), and/or other useful IC manufacturing data.

SBO model module 340 is configured to build one or more SBO models using IC manufacturing data, such as that stored by IC manufacturing database 335. The SBO model collectively simulates a mask making process and a wafer making process as a function of a mask shot map and an illumination source map. SBO model module 340 can store the one or more SBO models in an SBO database (not shown). In some implementations, SBO model module 340 performs various operations of method 150, such as those described with reference to block 154 and block 156. In particular, SBO model module 340 builds the SBO model using collected IC manufacturing data and maintains the SBO model according to newly collected IC manufacturing data, such that the SBO model is tuned to compensate for changes in the mask making processes and the wafer making processes. SBO process module 345 is configured to perform an SBO process (such as SBO process 140) using the SBO model, where the SBO process module 345 optimizes a given mask shot map and a given illumination source map based on the IC design layout, thereby minimizing differences between a target wafer pattern defined by the IC design layout and a simulated final wafer pattern generated using the given mask shot map and the given illumination source map. SBO process module 345 can provide the optimized mask shot map to mask making system 310 and the optimized illumination source map to wafer making system 315. In some implementations, SBO process module 340 performs various operations of method 140, such as those described with reference to FIG. 5. In some implementations, mask fracturing module 325 is configured to generate a mask pattern, for example, by fracturing the IC design layout into mask regions (mask polygons) as described herein. The mask shot map can correspond with the mask pattern. For example, in some implementations, a mask shot map generated by SBO process module 340 defines exposure information, such as an exposure dose, for each mask region of the mask pattern. In alternative implementations, mask fracturing module 325 can be eliminated, such that SBO process module 345 generates the mask shot map for direct use by mask making system 310.

Figure 11:
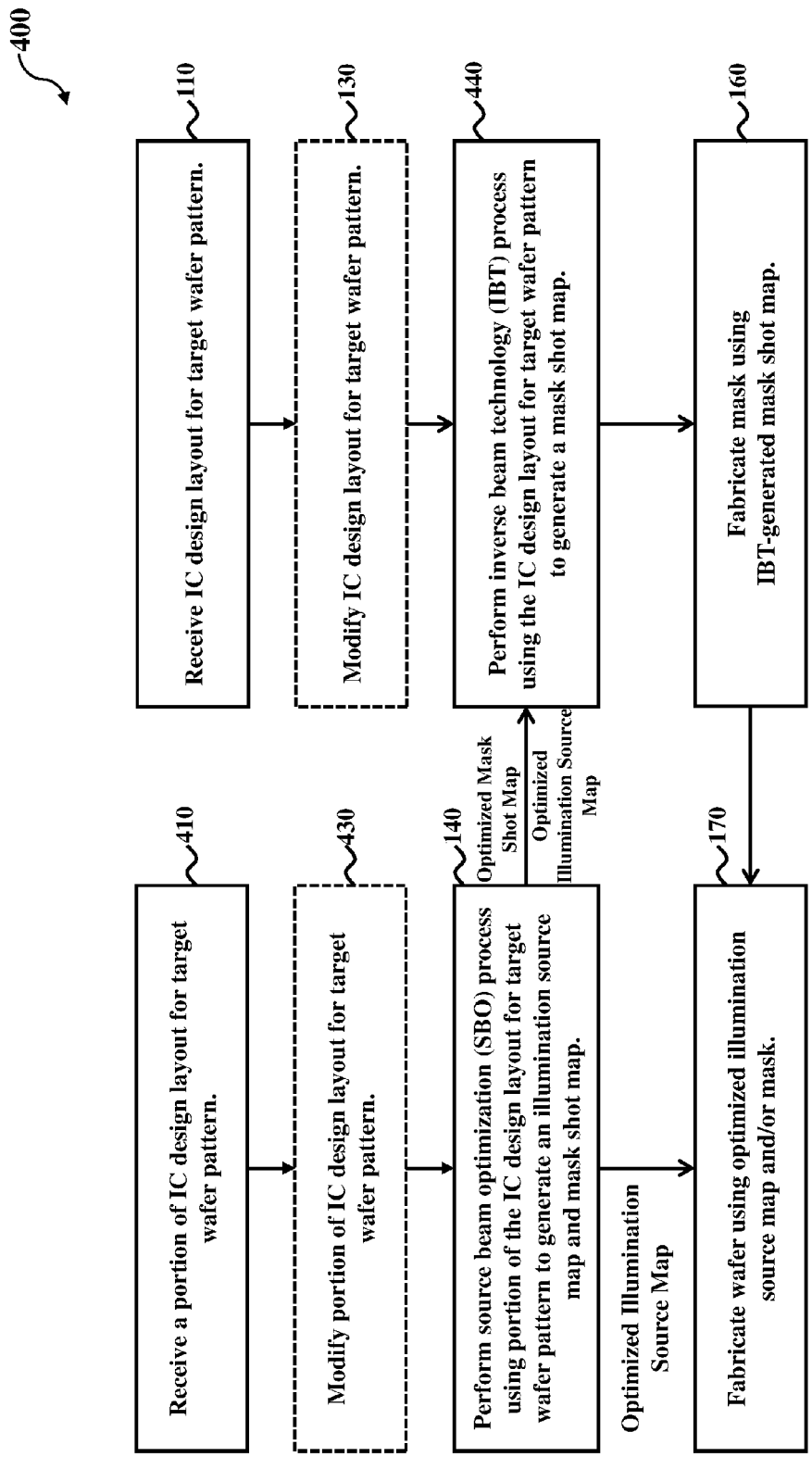
FIG. 11 is a flowchart of a method for fabricating an IC, which can be implemented by the IC manufacturing system of FIG. 1, according to various aspects of the present disclosure.

Turning again to FIG. 2, in some implementations, SBO process 140 is implemented for full-chip mask synthesis, using the IC design layout to generate the mask shot map and the illumination source map. Alternatively, to reduce processing time, in some implementations, SBO process 140 uses portions of IC design layout for generating the mask shot map and the illumination source. FIG. 11 is a flowchart of a method 400 for fabricating an integrated circuit (IC), which can be implemented by IC manufacturing system 10 of FIG. 1, according to various aspects of the present disclosure. In method 400, as described below, a wafer making process uses an illumination source map generated by an SBO process using portions of an IC design layout, while a mask making process uses a mask shot map generated by an inverse beam technology (IBT) process using the IC design layout. Method 400 can enhance lithography printability similar to method 100, while increasing throughput compared to method 100. Since method 400 is similar in many respects to method 100, similar operations in FIG. 11 and FIG. 2 are identified by the same reference numerals for clarity and simplicity. Additional steps can be provided before, during, and after SBO process 140, and some of the steps described can be moved, replaced, or eliminated for additional embodiments of SBO process 140.

A wafer making process can begin with block 410 and block 430, where method 400 includes receiving portions of an IC design layout for a target wafer pattern, and optionally, modifying portions of the IC design layout for the target wafer pattern. Block 410 and block 430 are similar to block 110 and block 130 described above with reference to method 100, except block 410 and block 430 involve only a portion of the IC design layout. Accordingly, method 400 proceeds to SBO process 140, which generates an optimized illumination source map and an optimized mask shot map using the portion of the IC design layout. Method 400 proceeds with block 170, where a wafer making process is performed to fabricate a wafer using the optimized illumination source map.

A mask making process can begin with block 110 and block 130. Method 400 proceeds to block 440, where an IBT process generates a mask shot map $m_{f(IBT)}$ (referred to herein as an IBT-generated mask shot map) using the IC design layout. For ease of discussion, block 440 is referred to as IBT process 440. IBT process 440 uses an IBT model that simulates a final wafer pattern by collectively simulating a mask making process and a wafer making process as a function of a given mask shot map. In some implementations, the IBT model is the same as the SBO model used in SBO process 140, though the following discussion is directed towards implementations where the IBT model and the SBO model implement different parameters. Using the IBT model, IBT process 440 tunes the mask shot map to minimize differences between an IBT-predicted final wafer pattern $P_{IBT}$ and target wafer pattern T defined by the IC design layout. The IBT model generates the predicted final wafer pattern $P_{IBT}$ as a function of the simulated mask making process and the simulated wafer marking process, as expressed by:

$$P_{IBT}(x,y) = \Gamma_{IBT}(I_{IBT}(\Phi_{IBT}(m_{f(IBT)}(x,y)))), \quad \text{Equation (14)}$$

where a predicted final wafer pattern $P_{IBT}(x, y)$ defines a contour of a final wafer pattern formed in a wafer material layer generated by an IBT-simulated wafer making process, a wafer patterning function $\Gamma_{IBT}$ defines lithography process characteristics associated with the IBT-simulated wafer making process, a projected wafer image function $I_{IBT}$ defines an image of a mask on a resist layer during an exposure process associated with the lithography process, a mask patterning function $\Phi_{IBT}$ defines lithography process characteristics associated with an IBT-simulated mask making process, and a mask shot map $m_{f(IBT)}(x,y)$ defines an exposure pattern for fabricating the mask during the IBT-simulated mask making process. The IBT model is further used in the IBT process to define an optimization (minimization) problem as expressed by:

$$\min_{m_{f(IBT)}} \|P_{IBT} - T\| = \quad \text{Equation (15)}$$
$$\min_{m_{f(IBT)}} \|\Gamma_{IBT}(I_{IBT}(\Phi_{IBT}(m_{f(IBT)}(x, y)))) - T\|,$$

where IBT process 440 tunes an exposure pattern of mask shot map $m_{f(IBT)}(x,y)$ in a manner that minimizes the difference between IBT-predicted final wafer pattern $P_{IBT}(x, y)$ and target wafer pattern T. IBT process 440 and associated IBT model are described by U.S. patent application Ser. No. 14/832,026, filed Aug. 21, 2015, the entire disclosure of which is incorporated herein by reference. IBT process 440 can eliminate errors arising from stage-by-stage mask optimization methods, such as optical proximity correction (OPC) methods, inverse lithography technology (ILT) methods, and/or mask process correction (MPC) methods. In some implementations, IBT process 440 can use the optimized illumination source map generated by SBO process 140 during IBT-simulated wafer making processes, though it is noted that IBT process 440 does not optimize illumination source optics information, such as those defined by illumination source maps. In some implementations, where the IBT model and the SBO model use the same parameters, the SBO process can generate a portion of the mask shot map based on the portion of the IC design layout, and the IBT process can generate the remaining portion of the mask shot map based on the entire IC design layout and/or the optimized mask layout generated by the SBO process. At block 160, method 400 includes fabricating a mask using the mask shot map generated by IBT process 440, such as IBT-generated mask shot map $m_{f(IBT)}(x,y)$. In some implementations, the wafer making process at block 170 uses the mask fabricated at block 160 in conjunction with the optimized illumination source map generated by SBO process 140.

Source beam optimization (SBO) processes are disclosed herein for enhancing lithography printability. SBO processes disclosed herein generate optimized exposure data for a mask making process and a wafer making process, such as an optimized mask shot map and an optimized illumination source map. In contrast to conventional lithography optimization processes, which do not consider mask making effects (such as OPC processes, ILT processes, and/or source mask optimization (SMO) processes), SBO processes described herein optimize the exposure data compensating for both mask making effects (caused, for example, by mask writing blur and/or other mask making factors) and wafer making effects (caused, for example, by resist blur, mask diffraction (which is influenced by illumination source optics), projection imaging resolution, etching bias, and/or other wafer making processes). By optimizing both exposure sources, SBO significantly reduces (and can even eliminate) variances between a final wafer pattern (such as final wafer pattern 60) and a target wafer pattern provided by an IC design layout (such as IC design layout 35), particularly compared to conventional lithography optimization processes, such as SMO. In some implementations, SBO can replace or operate in conjunction with the other lithography optimization processes, such as OPC (which simulate only wafer making processes for optimizing mask patterns only), ILT (which simulate only wafer making processes for optimizing mask patterns only), and/or SMO (which simulate only wafer making processes for optimizing mask patterns with illumination sources). In some implementations, SBO can eliminate errors arising from stage-by-stage mask optimization processes, such as OPC, ILT, and/or MPC. Furthermore, SBO improves upon IBT processes by considering both an illumination source map and a mask shot map, thereby providing more optimization freedom. It is noted that different embodiments disclosed herein offer different advantages and no particular advantage is necessarily required in all embodiments.

An exemplary method includes receiving an IC design layout and performing an SBO process using the IC design layout to generate a mask shot map and an illumination source map. The SBO process uses an SBO model that collectively simulates a mask making process using the mask shot map and a wafer making process using the illumination source map. A mask can be fabricated using the mask shot map, and a wafer can be fabricated using the illumination source map (and, in some implementations, using the mask fabricated using the mask shot map). The wafer includes a final wafer pattern that corresponds with a target wafer pattern defined by the IC design layout. In some implementations, the SBO process generates the mask shot map and the illumination source map that minimizes a difference between a predicted final wafer pattern and a target wafer pattern, wherein the SBO process generates the predicted final wafer pattern from the simulated mask making process and the simulated wafer making process, and further wherein the target wafer pattern is defined by the IC design layout. The SBO model simulates the final wafer pattern as defined as a function of the mask shot map and the illumination source map, which are functions of a wafer patterning function, a mask patterning function, and a projected wafer imaging functions. The SBO process uses the SBO model to define an optimization problem that minimizes a difference between the simulated final wafer pattern and the target wafer pattern. Exemplary relationships between such functions and/or optimization (minimization) problems are described in detail above. The SBO process can include adjusting the mask shot map and illumination source map until a desired fit is achieved between the predicted final wafer pattern and the target wafer pattern.

In some implementations, the method further includes fabricating a mask using the mask shot map, wherein the mask includes a final mask pattern corresponding with a mask pattern associated with the mask shot map, and further wherein the mask pattern corresponds with a target wafer pattern defined by the IC design layout. In some implementations, the mask shot map is an electron beam (e-beam) shot map, and fabricating the mask includes performing an e-beam lithography process using the e-beam shot map. In such implementations, the method can further include generating the mask pattern by fracturing the IC design layout into mask regions, wherein the e-beam shot map defines an exposure dose and/or an exposure shape for patterning each mask region on the mask. In some implementations, the method further includes fabricating a wafer using the illumination source map, wherein the wafer includes a final wafer pattern that corresponds with a target wafer pattern defined by the IC design layout. Fabricating the wafer can include performing an exposure process that illuminates a mask with illumination source optics defined by the illumination source map. The mask used during the exposure process can be fabricated using the mask shot map. In some implementations, the SBO process is performed using a portion of the IC design layout to generate the mask shot map and the illumination source map, and the method further includes fabricating a wafer using the illumination source map. In such implementations, the method can further include performing an inverse beam technology (IBT) process using the IC design layout to generate an IBT-generated mask shot map, wherein the IBT process uses an IBT model that collectively simulates a mask making process and the wafer making process as a function of a given mask shot map. In some implementations, the IBT model simulates the wafer making process using an optimized illumination source map generated by the SBO process. Such implementations can further include fabricating a mask using the IBT-generated mask shot map, wherein the mask is used when fabricating the wafer.

Another exemplary method includes receiving an IC design layout defining a target wafer pattern, a mask shot map, and an illumination source map, and simulating a final wafer pattern based on the mask shot map and the illumination source map, wherein the simulating uses a source beam optimization (SBO) model that collectively simulates a mask making process using the mask shot map and a wafer making process using the illumination source map. The method can further include adjusting the mask shot map and the illumination source map based on a fit between the simulated final wafer pattern and the target wafer pattern, and generating an optimized mask shot map and an optimized illumination source map when the fit minimizes variances between the simulated final wafer pattern and the target wafer pattern. The SBO model simulates the final wafer pattern as defined as a function of the mask shot map and the illumination source map, which are functions of a wafer patterning function, a mask patterning function, and a projected wafer imaging functions. The SBO model further defines an optimization problem that minimizes a difference between the simulated final wafer pattern and the target wafer pattern. Exemplary relationships between such functions and/or optimization (minimization) problems are described in detail above.

In some implementations, the method further includes fabricating a mask using the optimized mask shot map, wherein the mask includes a final mask pattern corresponding with a mask pattern associated with the mask shot map, and further wherein the mask pattern corresponds with the target wafer pattern. In some implementations, the method further includes fabricating a wafer using the optimized illumination source map, wherein the wafer includes a final wafer pattern that corresponds with the target wafer pattern defined by the IC design layout. Fabricating the wafer can include performing an exposure process that illuminates the mask with illumination source optics defined by the optimized illumination source map. In some implementations, the method further includes generating the mask pattern by fracturing the IC design layout into mask regions, wherein the mask shot map defines an exposure dose and/or an exposure shape for patterning each mask region on the mask.

An exemplary source beam optimization (SBO) system for use in integrated circuit (IC) manufacturing includes an IC manufacturing data collection module configured to collect IC manufacturing data associated with mask making processes and wafer making processes; an SBO model module configured to build an SBO model using the manufacturing data, wherein the SBO model collectively simulates a mask making process using a given mask shot mask and a wafer making process using a given illumination source map; and an SBO process module configured to perform an SBO process using the SBO model to optimize the given mask shot map and the given illumination source map based on an IC design layout, thereby minimizing differences between a target wafer pattern defined by the IC design layout and a simulated final wafer pattern generated using the given mask shot map and the given illumination source map.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for enhancing lithography printability, the method comprising:
   receiving an integrated circuit (IC) design layout; and
   performing a source beam optimization (SBO) process using the IC design layout to generate a mask shot map and an illumination source map, wherein the SBO process uses an SBO model that collectively simulates a mask making process using the mask shot map and simulates a wafer making process using the illumination source map.

2. The method of claim 1, wherein the SBO process generates the mask shot map and the illumination source map that minimizes a difference between a predicted final wafer pattern and a target wafer pattern, wherein the SBO process generates the predicted final wafer pattern from the simulated mask making process and the simulated wafer making process, and further wherein the target wafer pattern is defined by the IC design layout.

3. The method of claim 2, wherein the SBO model generates the predicted final wafer pattern as a function of the simulated mask making process and the simulated wafer marking process, as expressed by:

$$P(x,y)=\gamma(1(S(x,y),\Phi(m_f(x,y)))),$$

wherein:
   a predicted final wafer pattern $P(x, y)$ defines a contour of a final wafer pattern formed in a wafer material layer generated by the simulated wafer making process,
   a wafer patterning function $\Gamma$ defines lithography process characteristics of a lithography process associated with the simulated wafer making process,
   a projected wafer image function $I$ defines an image of a mask on a resist layer during an exposure process associated with the lithography process,
   an illumination source map $S(x,y)$ defines illumination source optics for illuminating the mask during the simulated wafer making process,
   a mask patterning function $\Phi$ defines lithography process characteristics associated with the simulated mask making process, and
   a mask shot map $m_f(x,y)$ defines an exposure pattern for fabricating the mask during the simulated mask making process.

4. The method of claim 3, wherein the SBO model is used during the SBO process to define an optimization problem that minimizes the difference between the predicted final wafer pattern and the target wafer pattern as expressed by:

$$\min_{S,m_f}\|P-T\|=\min_{S,m_f}\|\Gamma(I(S(x,y),\Phi(m_f(x,y))))-T\|$$

wherein P is the predicted final wafer pattern $P(x, y)$ and T defines a contour of a target wafer pattern based on the IC design layout.

5. The method of claim 4, wherein the SBO process includes adjusting mask shot map $m_f$ and illumination source map S until a desired fit is achieved between the predicted final wafer pattern and the target wafer pattern.

6. The method of claim 1, further comprising fabricating a mask using the mask shot map, wherein the mask includes a final mask pattern corresponding with a mask pattern associated with the mask shot map, and wherein the mask pattern corresponds with a target wafer pattern defined by the IC design layout.

7. The method of claim 6, wherein the mask shot map is an electron beam (e-beam) shot map, and the fabricating the mask includes performing an e-beam lithography process using the e-beam shot map.

8. The method of claim 7, further comprising generating the mask pattern by fracturing the IC design layout into mask regions, wherein the e-beam shot map defines an exposure dose and/or an exposure shape for patterning each mask region on the mask.

9. The method of claim 1, further comprising fabricating a wafer using the illumination source map, wherein the wafer includes a final wafer pattern that corresponds with a target wafer pattern defined by the IC design layout.

10. The method of claim 9, wherein the fabricating the wafer includes performing an exposure process that illuminates a mask with illumination source optics defined by the illumination source map.

11. The method of claim 10, wherein the mask used during the exposure process was fabricated using the mask shot map.

12. The method of claim 1, wherein the SBO process is performed using a portion of the IC design layout to generate the illumination source map.

13. The method of claim 12, further comprising:
   performing an inverse beam technology (IBT) process using the IC design layout to generate an IBT-generated mask shot map, wherein the IBT process uses an IBT model that collectively simulates a mask making process and a wafer making process that implements illumination source optics based on the illumination source map;
   fabricating a mask using the IBT-generated mask shot map; and
   fabricating a wafer using the mask and the illumination source map.

14. A method for enhancing lithography printability, the method comprising:
   receiving an integrated circuit (IC) design layout that defines a target wafer pattern;
   receiving a mask shot map and an illumination source map;
   in a source beam optimization (SBO) process, simulating a final wafer pattern based on the mask shot map and the illumination source map, wherein the simulating uses an SBO model that collectively simulates a mask making process using the mask shot map and simulates a wafer making process using the illumination source map;
   adjusting the mask shot map and the illumination source map based on a fit between the simulated final wafer pattern and the target wafer pattern; and
   generating an optimized mask shot map and an optimized illumination source map when the fit minimizes variances between the simulated final wafer pattern and the target wafer pattern.

15. The method of claim 14, wherein the SBO model simulates the final wafer pattern as expressed by:

$$P(x,y)=\Gamma(I(S(x,y),\Phi(m_f(x,y)))), \text{ wherein:}$$

a predicted final wafer pattern $P(x, y)$ defines a contour of a final wafer pattern formed in a wafer material layer generated by the simulated wafer making process, a wafer patterning function Γ defines lithography process characteristics associated with the simulated wafer making process, a projected wafer image function I defines an image of a mask on a resist layer during an exposure process associated with the lithography process, an illumination source map S(x,y) defines illumination source optics for illuminating the mask during the simulated wafer making process, a mask patterning function Φ defines lithography process characteristics associated with the simulated mask making process, and a mask shot map $m_f$(x,y) defines an exposure pattern for fabricating the mask during the simulated mask making process.

16. The method of claim 15, wherein the SBO model is used in the SBO process to define an optimization problem that minimizes a difference between the simulated final wafer pattern and the target wafer pattern as expressed by:

$$\min_{S, m_f} \|P - T\| = \min_{S, m_f} \|\Gamma(I(S(x, y), \Phi(m_f(x, y)))) - T\|$$

wherein P is the predicted final wafer pattern P(x, y) and T defines a contour of the target wafer pattern based on the IC design layout.

17. The method of claim 14, further comprising:

fabricating a mask using the optimized mask shot map, wherein the mask includes a final mask pattern corresponding with a mask pattern associated with the mask shot map, and wherein the final mask pattern corresponds with the target wafer pattern; and fabricating a wafer using the optimized illumination source map and the mask, wherein the wafer includes a final wafer pattern that corresponds with the target wafer pattern defined by the IC design layout.

18. The method of claim 17, wherein the fabricating the wafer includes performing an exposure process that illuminates the mask with illumination source optics defined by the optimized illumination source map.

19. The method of claim 17, further comprising generating the mask pattern by fracturing the IC design layout into mask regions, wherein the mask shot map defines an exposure dose and/or an exposure shape for patterning each mask region of the mask regions on the mask.

20. A source beam optimization (SBO) system for use in integrated circuit (IC) manufacturing, the SBO system comprising:

an IC manufacturing data collection module configured to collect integrated circuit (IC) manufacturing data associated with mask making processes and wafer making processes;

an SBO model module configured to build an SBO model using the IC manufacturing data, wherein the SBO model collectively simulates a mask making process using a given mask shot map and a wafer making process using a given illumination source map; and an SBO process module configured to perform an SBO process using the SBO model that optimizes the given mask shot map and the given illumination source map based on an IC design layout, thereby minimizing differences between a target wafer pattern defined by the IC design layout and a simulated final wafer pattern generated using the given mask shot map and the given illumination source map.

* * * * *